(12) United States Patent
Restrepo et al.

(10) Patent No.: US 11,214,658 B2
(45) Date of Patent: Jan. 4, 2022

(54) ADDITIVE COATED PARTICLES FOR LOW COST HIGH PERFORMANCE MATERIALS

(71) Applicant: Garmor Inc., Orlando, FL (US)

(72) Inventors: David Restrepo, Orlando, FL (US);
Matthew McInnis, Orlando, FL (US);
Richard Stoltz, Plano, TX (US); Jeff Bullington, Orlando, FL (US)

(73) Assignee: Garmor Inc., Orlando, FL (US)

( * ) Notice: Subject to any disclaimer, the term of this patent is extended or adjusted under 35 U.S.C. 154(b) by 27 days.

(21) Appl. No.: 16/343,855

(22) PCT Filed: Oct. 26, 2017

(86) PCT No.: PCT/US2017/058512
§ 371 (c)(1),
(2) Date: Apr. 22, 2019

(87) PCT Pub. No.: WO2018/081413
PCT Pub. Date: May 3, 2018

(65) Prior Publication Data
US 2019/0263977 A1 Aug. 29, 2019

Related U.S. Application Data

(60) Provisional application No. 62/413,072, filed on Oct. 26, 2016.

(51) Int. Cl.
| | | |
|---|---|---|
| *C08J 3/12* | (2006.01) | |
| *B02C 15/00* | (2006.01) | |
| *B02C 17/16* | (2006.01) | |
| *B02C 17/18* | (2006.01) | |
| *B02C 17/20* | (2006.01) | |
| *C08K 3/04* | (2006.01) | |
| *C09C 1/48* | (2006.01) | |
| *C09C 3/10* | (2006.01) | |
| *C09C 3/04* | (2006.01) | |
| *B29C 70/88* | (2006.01) | |
| *C08K 9/02* | (2006.01) | |
| *C08K 3/08* | (2006.01) | |

(52) U.S. Cl.
CPC ............. *C08J 3/128* (2013.01); *B02C 15/004* (2013.01); *B02C 17/163* (2013.01); *B02C 17/183* (2013.01); *B02C 17/20* (2013.01); *C08J 3/124* (2013.01); *C08K 3/04* (2013.01); *C09C 1/48* (2013.01); *C09C 3/04* (2013.01); *C09C 3/10* (2013.01); *B29C 70/882* (2013.01); *C08J 2327/18* (2013.01); *C08J 2427/16* (2013.01); *C08K 3/08* (2013.01); *C08K 9/02* (2013.01)

(58) Field of Classification Search
CPC ........ C08J 3/124; C08J 3/128; C08J 2427/16; C08J 2327/18; C09C 1/48; C09C 3/04; C09C 3/10; B02C 15/004; B02C 17/163; B02C 17/183; B02C 17/20; C08K 3/04; C08K 3/08; C08K 9/02; B29C 70/882; C01B 32/198

See application file for complete search history.

(56) References Cited

U.S. PATENT DOCUMENTS

| | | | |
|---|---|---|---|
| 2,459,520 A | | 1/1949 | Greenshields |
| 5,057,370 A | * | 10/1991 | Krieg .................... B29C 70/882 |
| | | | 428/403 |
| 5,360,582 A | | 11/1994 | Boyd et al. |
| 5,501,934 A | | 3/1996 | Sukata et al. |
| 5,506,061 A | | 4/1996 | Kindl et al. |
| 5,509,993 A | | 4/1996 | Hirschvogel |
| 5,583,176 A | | 12/1996 | Haberle |
| 5,883,176 A | | 3/1999 | Gerroir et al. |
| 6,004,712 A | | 12/1999 | Barbetta et al. |
| 6,172,163 B1 | | 1/2001 | Rein et al. |
| 6,348,279 B1 | | 2/2002 | Saito et al. |
| 6,436,567 B1 | | 8/2002 | Saito et al. |
| 7,005,205 B1 | | 2/2006 | Gyoten et al. |
| 7,231,084 B2 | | 6/2007 | Tang et al. |
| 7,329,698 B2 | | 2/2008 | Noguchi et al. |
| 7,623,340 B1 | | 11/2009 | Song et al. |
| 8,168,964 B2 | | 5/2012 | Hiura et al. |
| 8,216,541 B2 | | 7/2012 | Jang et al. |
| 8,580,132 B2 | | 11/2013 | Lin et al. |
| 9,758,379 B2 | | 9/2017 | Blair |
| 9,802,206 B2 | | 10/2017 | Kitaura et al. |
| 10,138,969 B2 | | 11/2018 | Hattori et al. |
| 10,287,167 B2 | | 5/2019 | Blair |

(Continued)

FOREIGN PATENT DOCUMENTS

| | | |
|---|---|---|
| CN | 101462889 A | 6/2009 |
| CN | 102021633 A | 4/2011 |

(Continued)

OTHER PUBLICATIONS

Chemical Book, <<https://www.chemicalbook.com/ChemicalProductProperty_EN_CB8295389.htm>> (Year: 2017).*

(Continued)

*Primary Examiner* — Alexander M Weddle
(74) *Attorney, Agent, or Firm* — Edwin S. Flores; Chalker Flores, LLP

(57) ABSTRACT

Existing methods of extrusion and other techniques to compound host and additives material uniformly disperse the additive in the host. This innovation uses ball milling to a coat a host particle with an additive dramatically reducing the additive required to achieve a percolative network in the host.

24 Claims, No Drawings

(56) References Cited

U.S. PATENT DOCUMENTS

| | | |
|---|---|---|
| 2002/0008031 A1 | 1/2002 | Barsukov et al. |
| 2002/0119358 A1 | 8/2002 | Rock |
| 2002/0182387 A1 | 12/2002 | Mercuri et al. |
| 2004/0000735 A1 | 1/2004 | Gilbert, Sr. et al. |
| 2004/0033189 A1 | 2/2004 | Kaschak et al. |
| 2004/0209150 A1 | 10/2004 | Rock et al. |
| 2005/0041373 A1 | 2/2005 | Pruss |
| 2005/0191471 A1 | 9/2005 | Haggquist |
| 2005/0196636 A1 | 9/2005 | Kawakami et al. |
| 2005/0208319 A1 | 9/2005 | Finley et al. |
| 2007/0219336 A1 | 9/2007 | Ito |
| 2007/0284557 A1 | 12/2007 | Gruner et al. |
| 2008/0048152 A1 | 2/2008 | Jang et al. |
| 2008/0206124 A1 | 8/2008 | Jang et al. |
| 2008/0279710 A1 | 11/2008 | Zhamu et al. |
| 2008/0318110 A1 | 12/2008 | Budinski et al. |
| 2009/0017211 A1 | 1/2009 | Cruner et al. |
| 2009/0092747 A1 | 4/2009 | Zhamu et al. |
| 2009/0140801 A1 | 6/2009 | Ozyilmaz et al. |
| 2009/0215953 A1 | 8/2009 | Hwang et al. |
| 2009/0224420 A1 | 9/2009 | Wilkinson |
| 2009/0241496 A1 | 10/2009 | Pintault et al. |
| 2010/0006445 A1 | 1/2010 | Tomatschger |
| 2010/0028681 A1 | 2/2010 | Dai et al. |
| 2010/0055458 A1 | 3/2010 | Jang et al. |
| 2010/0056819 A1 | 3/2010 | Jang et al. |
| 2010/0092809 A1 | 4/2010 | Drzal et al. |
| 2010/0143732 A1 | 6/2010 | Swift et al. |
| 2010/0147188 A1 | 6/2010 | Mamak et al. |
| 2010/0151318 A1 | 6/2010 | Lopatin et al. |
| 2010/0209731 A1 | 8/2010 | Humano |
| 2010/0239870 A1 | 9/2010 | Bowen |
| 2010/0317790 A1 | 12/2010 | Jang et al. |
| 2011/0017585 A1 | 1/2011 | Zhamo et al. |
| 2011/0041980 A1 | 2/2011 | Kim et al. |
| 2011/0049437 A1 | 3/2011 | Crain et al. |
| 2011/0088931 A1 | 4/2011 | Lettow et al. |
| 2011/0120347 A1 | 5/2011 | Chung et al. |
| 2011/0143018 A1 | 6/2011 | Peng et al. |
| 2011/0143107 A1 | 6/2011 | Steinig-Nowakowski |
| 2011/0159372 A1 | 6/2011 | Zhamu et al. |
| 2011/0223405 A1 | 9/2011 | Compton et al. |
| 2011/0256376 A1 | 10/2011 | Compton et al. |
| 2011/0267673 A1 | 11/2011 | Agrawal et al. |
| 2011/0274610 A1 | 11/2011 | Paquette et al. |
| 2011/0281034 A1 | 11/2011 | Lee et al. |
| 2012/0025420 A1 | 2/2012 | Utashiro et al. |
| 2012/0055612 A1 | 3/2012 | Ahmed et al. |
| 2012/0077017 A1 | 3/2012 | Buresch |
| 2012/0107562 A1 | 5/2012 | Bolotin et al. |
| 2012/0129736 A1 | 5/2012 | Tour et al. |
| 2012/0184065 A1 | 7/2012 | Gharib et al. |
| 2012/0220198 A1 | 8/2012 | Peukert et al. |
| 2012/0228555 A1 | 9/2012 | Cheng et al. |
| 2012/0282419 A1 | 11/2012 | Ahn et al. |
| 2012/0298396 A1 | 11/2012 | Hong et al. |
| 2012/0298620 A1 | 11/2012 | Jiang et al. |
| 2013/0015409 A1 | 1/2013 | Fugetsu |
| 2013/0018204 A1 | 1/2013 | Jeon et al. |
| 2013/0114367 A1 | 5/2013 | Heusinger et al. |
| 2013/0156678 A1 | 6/2013 | Banerjee et al. |
| 2013/0217222 A1 | 8/2013 | Johnson et al. |
| 2013/0236715 A1 | 9/2013 | Zhamu et al. |
| 2013/0240033 A1 | 9/2013 | Jeon et al. |
| 2013/0264041 A1 | 10/2013 | Zhamu et al. |
| 2013/0272950 A1 | 10/2013 | Yun et al. |
| 2013/0330833 A1 | 12/2013 | Ruiz et al. |
| 2014/0018480 A1 | 1/2014 | Lee et al. |
| 2014/0030590 A1 | 1/2014 | Wang et al. |
| 2014/0117745 A1 | 5/2014 | Wilke et al. |
| 2014/0134092 A1 | 5/2014 | Shankman |
| 2014/0143018 A1 | 5/2014 | Nies et al. |
| 2014/0204384 A1 | 7/2014 | Lee et al. |
| 2014/0227211 A1 | 8/2014 | Shankman |
| 2014/0272199 A1 | 9/2014 | Lin et al. |
| 2014/0299475 A1 | 10/2014 | Bullington et al. |
| 2015/0266739 A1 | 9/2015 | Zhamu et al. |
| 2015/0284253 A1 | 10/2015 | Zhamu et al. |
| 2015/0368436 A1 | 12/2015 | Chiu et al. |
| 2016/0016803 A1 | 1/2016 | Stoltz et al. |
| 2016/0144339 A1 | 5/2016 | Kim et al. |
| 2016/0216629 A1* | 7/2016 | Grinwald .............. C09D 11/10 |
| 2017/0166722 A1 | 6/2017 | Zhamu et al. |
| 2017/0233290 A1 | 8/2017 | Christiansen et al. |
| 2019/0051903 A1 | 2/2019 | Manabe et al. |

FOREIGN PATENT DOCUMENTS

| | | | |
|---|---|---|---|
| CN | 102586952 A | 7/2012 | |
| CN | 102719719 A | 7/2012 | |
| CN | 103058541 A | 4/2013 | |
| CN | 103130436 A | 6/2013 | |
| CN | 103215693 A | 7/2013 | |
| CN | 103408880 A | 11/2013 | |
| CN | 103545536 A | 1/2014 | |
| CN | 103757823 A | 4/2014 | |
| CN | 103819915 A | 5/2014 | |
| CN | 103962102 A | 8/2014 | |
| CN | 104319372 A | 1/2015 | |
| CN | 104446176 A | 3/2015 | |
| CN | 104844930 A | 4/2015 | |
| CN | 106700356 A | 5/2017 | |
| CN | 108276576 A | 7/2018 | |
| EP | 0949704 A1 | 10/1999 | |
| EP | 1227531 A1 | 7/2002 | |
| EP | 2560228 A1 | 2/2013 | |
| GB | 723598 A | 2/1955 | |
| JP | S6169853 A | 4/1986 | |
| JP | 64009808 A | 1/1989 | |
| JP | 2012007224 A | 1/2012 | |
| JP | 2012136567 A | 7/2012 | |
| KR | 20110119429 A | 11/2011 | |
| KR | 20130048741 A | 4/2013 | |
| KR | 20130090979 A | 8/2013 | |
| KR | 1020150026092 | 3/2015 | |
| RU | 2456361 C1 | 7/2012 | |
| WO | 2009032069 A1 | 3/2009 | |
| WO | 2009059193 A1 | 5/2009 | |
| WO | 2010089326 A1 | 8/2010 | |
| WO | 2010091352 A2 | 8/2010 | |
| WO | 2011014242 A1 | 2/2011 | |
| WO | 2011074125 | 6/2011 | |
| WO | 2011078639 A2 | 6/2011 | |
| WO | 2011086391 A1 | 7/2011 | |
| WO | 2011087301 A2 | 7/2011 | |
| WO | 2011099761 A2 | 8/2011 | |
| WO | 2011162727 A1 | 12/2011 | |
| WO | 2012058553 A2 | 5/2012 | |
| WO | 2012148880 A2 | 11/2012 | |
| WO | 2012177864 A1 | 12/2012 | |
| WO | 2013001266 A1 | 1/2013 | |
| WO | 2013096990 A1 | 7/2013 | |
| WO | 2014062226 A1 | 4/2014 | |
| WO | 2014080144 A1 | 5/2014 | |
| WO | 2014104446 A1 | 7/2014 | |
| WO | 2014138587 A1 | 9/2014 | |
| WO | WO-2014138587 A1 * | 9/2014 | ............. C01B 32/23 |
| WO | 2014210584 A1 | 12/2014 | |
| WO | 2015065893 A1 | 5/2015 | |
| WO | 2016040612 A1 | 3/2016 | |
| WO | 2016123080 A1 | 8/2016 | |
| WO | 2016154057 A1 | 9/2016 | |
| WO | 2016200469 A1 | 12/2016 | |
| WO | 2017053204 A1 | 3/2017 | |
| WO | 2018008143 A1 | 5/2018 | |

OTHER PUBLICATIONS

Chemical Book, <<https://www.chemicalbook.com/ProductChemical PropertiesCB8123794_EN.htm>> (Year: 2017).*

Extended European Search Report for EP 16849382.3 dated Apr. 30, 2019, 10 pp.

(56) References Cited

OTHER PUBLICATIONS

Extended European Search Report for EP 17865997.5 dated Jul. 22, 2019, 7 pp.
International Search Report and Written Opinion for PCT/US2019/051405 from KIPO dated Jan. 3, 2020, 11 pp.
Rahman, M.A., et al., "The effect of residence time on the physical characterists of PAN-based fibers produced using a solvent-free coagulation process," Materials Science and Engineering A 448, 2007, pp. 275-280.
Wang, Q., et al., "Nanostructures and Surface Nanomechanical Properties of Polyacrylonitrile/Graphene Oxide Composite Nanofibers by Electrospinning," J. Appl. Polym. Sci., 2013.
Academic Press Dictionary of Science and Technology ("Flake", p. 1, obtained online Aug. 19, 2016).
Bourlinos, A.B., et al., "Graphite Oxide: Chemical Reduction to Graphite and Surface Modification with Primary Aliphatic Amines and Amino Acids," Langmuir 2003, vol. 19, pp. 6050-6055.
Ebinezar, et al., "Analysis of hardness test for aluminum carbon nanotube metal matrix and graphene," Indian Journal of Engineering, vol. 10, No. 21, 2014, pp. 33-39.
Extended European Search Report and Opinion for EPO 12844344.7 dated Oct. 22, 2015, 8 pp.
Extended European Search Report and Opinion for EPO 14759787.6 dated Oct. 6, 2016, 13 pp.
Extended European Search Report and Opinion for EPO 14760912.7 dated May 11, 2016, 8 pp.
Fang, M., et al., ""Covalent polymer functionalization of graphenenanosheets and mechanical properties of composites"" Journal of Materials Chemistry, 2009, vol. 19, No. 38, pp. 7098-7105.
Feng, H., et al., "A low-temperature method to produce highly reduced graphene oxide," Nature Communications, Feb. 26, 2013, 8 pp.
FMC, Persulfates Technical Information, (http://ww.peroxychem.com/media/90826/aod_brochure_persulfate.pdf, downloaded on Jan. 19, 2017) 16 pp.
Herman, A., et al., "Bipolar plates for PEM fuel cells: a review." International Journal of Hydrogen Energy, 2005, vol. 30, No. 12, pp. 1297-1302.
Hwang, T., et al., "One-step metal electroplating and patterning on a plastic substrate using an electrically-conductive layer of few-layer graphene," Carbon, Sep. 17, 2011, vol. 50, No. 2, pp. 612-621.
International Search Report and Written Opinion for PCT/US2012/061457 from KIPO dated Mar. 15, 2013, 10 pp.
International Search Report and Written Opinion for PCT/US2014/021765 from KIPO dated Jul. 24, 2014, 11 pp.
International Search Report and Written Opinion for PCT/US2014/021810 from KIPO dated Jul. 14, 2014, 10 pp.
International Search Report and Written Opinion for PCT/US2014/062371 from KIPO dated Feb. 11, 2015, 12 pp.
International Search Report and Written Opinion for PCT/US2015/045657 from KIPO dated Oct. 27, 2015, 6 pp.
International Search Report and Written Opinion for PCT/US2015/049398 from KIPO dated Dec. 16, 2015, 13 pp.
International Search Report and Written Opinion for PCT/US2016/014873 from KIPO dated May 13, 2016, 15 pp.
International Search Report and Written Opinion for PCT/US2016/022229 from KIPO dated Jun. 27, 2016, 15 pp.
International Search Report and Written Opinion for PCT/US2016/023273 from KIPO dated Jul. 12, 2016.
International Search Report and Written Opinion for PCT/US2016/023435 from KIPO dated May 30, 2016, 13 pp.
International Search Report and Written Opinion for PCT/US2016/025307 from KIPO dated Sep. 12, 2016, 11 pp.
International Search Report and Written Opinion for PCT/US2016/025338 from KIPO dated Jul. 25, 2016, 12 pp.
International Search Report and Written Opinion for PCT/US2016/052292 from KIPO dated Nov. 21, 2016, 14 pp.
International Search Report and Written Opinion for PCT/US2017/027231 from KIPO dated Jul. 11, 2017, 18 pp.
Jeon, I., et al., "Edge-carboxylated graphene nanosheets via ball milling." Proceedings of the National Academy of Sciences of the United States of AmericaPNAS, Apr. 10, 2012, vol. 109, No. 15, pp. 5588-5593.
Liu, Y. B., et al., "Recent development in the fabrication of metal matrix-particulate composites using powder metallurgy techniques," Journal of Materials Science, vol. 29, No. 8, 1994, pp. 1999-2007.
McQuarrie (2011, General Chemistry (4th Edition). University Science Books, Appendix G "Standard Reduction Voltages for Aqueous Solutions at 25C, p. A-34 to A-37 and also p. 949, Table 25.3. Online version available at:http://app.knovel.com/hotlink!toc/id:kpGCE00013/general-chemistry-4th/general-chemistry-4th)".
Merriam-Webster ("Definition of Flake" p. 1-9, obtained online Aug. 19, 2016).
Mohajerani, E., et al., "Morphological and thickness analysis for PMMA spin coated films," Journal of Optoelectronics and Advanced Materials, vol. 9:12, Dec. 2007, p. 3901-3906.
Moustafa, S.F., et al., "Copper matrix SiC and A12O3 particulate composites by powder metallurgy technique," Materials Letters, 2002, vol. 53, No. 4, pp. 244-249.
Ong, T. S., et al., "Effect of atmosphere on the mechanical milling of natural graphite," Carbon, 2000, vol. 38, No. 15, pp. 2077-285.
Rafiee, M. et al., "Fracture and fatigue in graphene nanocomposites." Small, 2010, vol. 6, No. 2, pp. 179-183.
Steurer, P., et al., ""Functionalized graphenes and thermoplasticnanocomposites based upon expanded graphite oxide."" Macromolecular Rapid Communications, 2009, vol. 30, Nos. 4-5, pp. 316-327.
Szabo, T., et al., "Evolution of Surface Functional Groups in a Series of Progressively Oxidized Graphite Oxides," Chem. Mater., vol. 18, Mar. 29, 2006, pp. 2740-2749.
Taeseon, H., et al.,"One-step metal electroplating and patterning on a plastic substrate using an electrically conductive layer of few-layer graphene," Carbon, Elsevier, Oxford, GB, vol. 50, No. 2, Sep. 8, 2011, pp. 612-621.
USP Technologies, "What is the pH of H2O2 solutions?," http://www.h2o2.com/faqs/FaqDetail.aspx?fld=26, accessed Jan. 19, 2017, 2 pp.
Wang, X. et al., ""In situ polymerization of graphene nanosheets and polyurethane with enhanced mechanical and thermal properties."" Journal of materials Chemistry, 2011, vol. 21, No. 12, pp. 4222-4227.
Wang, Y., et al., "Electrochemical Delamination of CVD-Grown Graphene Film: Toward the Recyclable Use of Copper Catalyst," ACS Nano, vol. 5, No. 12, Oct. 30, 2011, pp. 9927-9933.
Wu, Z-S. et al., "Field Emission of Single-Layer Films Prepared by Electrophoretic Deposition." Advanced Materials, 21, 2009, pp. 1756-1760.
Zhao, W., et al., "Preparation of graphene by exfoliation of graphite using wet ball milling." Journal of Materials Chemistry, Jun. 3, 2010, vol. 20, pp. 5817-5819.
Extended European Search Report and Opinion for EPO 17185605.7 dated Nov. 29, 2017, 7 pp.
International Search Report and Written Opinion for PCT/US2017/058512 from KIPO dated Feb. 7, 2018, 14 pp.
Oh, Won-Chun, et al., "The Effect of Thermal and Ultrasonic Treatment on the Formation of Graphene-oxide Nanosheets," Journal of the Korean Physical Society, vol. 56, No. 4, Apr. 2010, pp. 1097-1102.
Extended European Search Report for EP 16765526.5 dated Feb. 13, 2018, 7 pp.
Extended European Search Report for EP 16769452.0 dated Mar. 1, 2018, 9 pp.
Extended European Search Report for EP 16780450.9 dated Apr. 19, 2018, 17 pp.
Jeon, I-Y., et al., "Large Scale Production of Edge-Selectively Functionalized Graphene Nanoplatelets via Ball Milling and Their Use as Metal-Free Electrocatalysts for Oxygen Reduction Reaction," J Am Chem Soc (2013), 135-1386-1393.
Li, Y., et al., "Hybridizing wood cellulose and graphene oxide toward high-performance fibers," NPG Asia Materials, 7, Jan. 9, 2015, 14 pp.

(56) References Cited

OTHER PUBLICATIONS

Tissera, N., et al., "Hydrophobic cotton textile surfaces using an amphiphilic graphene oxide (GO) coating," Applied Surface Science, 324, Nov. 4, 2014 (2015), pp. 455-463.

Kaur, S., et al., "Enhanced thermal transport at covalently functionalized carbon nanotube array interfaces," Nature Communications, Jan. 22, 2014, pp. 1-8.

Maguire, J. A., et al., "Efficient low-temperature thermal functionalization of alkanes. Transfer dehydrogenation catalized by Rh(PMe3)2CI(CO) in solution under a high-pressure hydrogen atmosphere," J. Am. Chern. Soc., Aug. 1, 1991, vol. 113:17, pp. 6706-6708.

Babak, F., et al., "Preparation and Mechanical Properties of Graphene Oxide: Cement Nanocomposites," The Scientific World Journal, vol. 2014, ID 276323, 10 pp.

Extended European Search Report for EP 15834377.2 dated Mar. 9, 2018, 8 pp.

Extended European Search Report for EP 16780450.9 dated Jul. 13, 2018, 18 pp.

Wu, Q., et al., "Suprecapacitors Based on Flexible Graphene/Polyaniline Nanofiber Composite Films," ACS Nano (2010), 4(4):1963-1970.

Xia, et al., "Effects of resin content and preparing conditions on the properties of polyphenylene sulfide resin/graphite composite for bipolar plate," Journal of Power Sources, vol. 178, Dec. 5, 2007, pp. 363-367.

Kirschner, M., "Ozone," Ullmann's Enclyclopedia of Industrial Chemistry, vol. 25, 2012, pp. 637-644.

Minus, M., et al., "The Processing, Properties, and Structure of Carbon Fibers," JOM, Feb. 2005, pp. 52-58.

Pauling, L., General Chemistry, Chapter 15, "Oxidation-Reduction Reactions. Electrolysis," Dover Publications, Inc., 1970, 41 pp.

Polymers: A Properties Database, "Poly(ethylene terphthalate)", Chemnetbase, downloaded from http://poly.chemnetbase.com, Jan. 24, 2016, 5 pp.

CN 102586952 Google translation 7 pp.

CN 103545536 Google translation 5 pp.

Gong, et al., "Optimization of the Reinforcement of Polymer-Based Nanocomposites with Graphene," ECCM15-15th European Conference on Composite Materials, Venice, Italy, Jun. 24-28, 2012.

Gulotty, R., et al., "Effects of Functionalization on Thermal Properties of Single-Wall and Multi-Wall Carbon Nanotube—Polymer Nancomposites," UC Riverside—Polytechnic of Turin (2013), 25 pp.

Porter, Roger S. et al., "Property Opportunities with Polyolefins, A Review Preparations and Applications of High Stiffness and Strength by Uniaxial Draw," Polymer, 35:23, 1994, pp. 4979-4984.

Song, M., et al., "The Effect of Surface Functionalization on the Immobilization of Gold Nanoparticles on Graphene Sheets," Journal of Nanotechnology, vol. 2012, Art. ID 329318, Mar. 28, 2012, 5 pp.

Extended European Search Report for EP 19862892.7 dated Oct. 12, 2021, 11 pp.

Osicka, et al., "Light-Induced and Sensing Capabilities of SI-ATRP Modified Graphene Oxide particles in Elastomeric Matrix," Active and Passive Smart Structures and Integrated Systems 2017, vol. 10164, 1016434, doi: 10.1117/12.2260703, 10.pp.

Wang, Y., et al., "Kevlar oligomer functionalized graphene for polymer composites," Polymer, 52, Juen 15, 2011, 3661-3670.

\* cited by examiner

ADDITIVE COATED PARTICLES FOR LOW COST HIGH PERFORMANCE MATERIALS

CROSS-REFERENCE TO RELATED APPLICATIONS

This application is the National Stage of International Application No. PCT/US2017/058512, filed on Oct. 26, 2017 claiming the priority to U.S. Provisional Application No. 62/413,072 filed on Oct. 26, 2016, the contents of each of which are incorporated by reference herein.

BACKGROUND OF THE INVENTION

Without limiting the scope of the invention, its background is described in connection with additives.

Carbon black when used as an additive has been shown to enhance mechanical, chemical, thermal, gas barrier, electrical, flame retardant and other properties of a host. Improvement in the physicochemical properties of the host depends on: 1) a uniform distribution and entrainment of the carbon black, 2) optimizing the interfacial bonding between the carbon black and host's matrix, 3) removal of gasses entrained in the host during processing, 4) optimizing the additive's innate properties, e.g. functionalization of the surface 5) optimizing the loading of the additive in the host.

Without limiting the scope of the invention, its background is described in connection with composite materials. Carbon black is a common additive used to enhance strength, electrical and thermal conductivity of a host. Because of the abundance of low cost carbon black, it has driven the electrical, thermal and mechanical benchmark specifications for carbon-filled composites.

The traditional method of compounding carbon black in a host is to melt-mix in an extruder. The extruded composite is then cut into pellets. These pellets are in general <5 mm long by <4 mm wide by <1 mm thick. These pellets can be further used for injection molding, powder coating or as a masterbatch. A masterbatch is a solid or liquid additive used to impart coloring or other properties to the host. A masterbatch is a concentrated mixture of additives encapsulated during a heating or extruding process into a host resin, which is then cooled and cut into a pellet and then ground/machined into a granular shape. Masterbatching is an economical method to store and then deliver an additive to a host during the manufacturing process.

The masterbatch preparation process yields a compounded composite that has a resistivity of ~100 k$\Omega$*cm to 200 k$\Omega$*cm at an ultimate carbon black loading of ~3% to 4% by mass relative to the host resin as a powder coated film. The masterbatching processing technique is designed to produce a cost effective material for storage and compounding and not for optimizing the additive's performance in a host. This dispersion/compounding process uniformly distributes the carbon black throughout the volume of the host artificially increasing the loading necessary to achieve a percolation threshold or an adequate electrical conductivity for a given application. Alternatively, non-random distributions of carbon filler in a polymer matrix are ideal for many applications as exemplified by unidirectional or woven carbon fiber composites.

SUMMARY OF THE INVENTION

The increasing cost of raw materials in the world has generated a demand to optimize material utilization in almost every process. The growing demand of the electronics and RF markets for both EMI shielding and ESD protection has and is placing a large demand on specialized carbon black, functionalized for high conductivity. The traditional dispersion/compounding entrains the carbon black uniformly through the volume of the masterbatch pellet or powder particle.

The method herein enables the dispersion/compounding of carbon black or any additive to a host in a manner that optimizes performance while minimizing the mass of the additive used in the application. The particles of the host material are coated with the filler additive using a milling process. These particles may be hot-pressed, stamped, extruded, injected molded or used in a powder coating. The coated surface makes connective pathways through the volume of the final composite structure. The connective structures form a unique pattern within the volume of composite structure with extensive well-connected percolating networks of carbon black surrounding vacuoles of the host material where there is no carbon black entrained in the vacuoles.

In one embodiment, the present invention includes a method of making an additive coated host particle for making a composite material for enhancing the material property, comprising: providing a powdered host; providing a powdered additive with a softening or melting temperature higher than the melting point of said powdered host; inputting said powdered host and said powdered additive to a ball mill; and milling said powdered host and said powdered additive for a milling time to sufficient mix but not melt the host particle. In one aspect, the method further comprises the step of dry blending a neat polymer powder to enhance flowability and processability of powder. In another aspect, the host is a powder from a resin. In another aspect, the host is a powder from a metal. In another aspect, the host is a powder from a ceramic. In another aspect, the additive is a powder to alter the physical properties including thermal, electrical, optical or mechanical. In another aspect, the additive is carbon black. In another aspect, the milling is in a ball mill, and wherein the ball mill uses stainless steel balls weighing at least 1 g each. In another aspect, the milling is in a closed chamber for 10 to 100 minutes at 1,000 RPM or less. In another aspect, the milling is a sand, bead, and horizontal mill at an rpm of 100-1000. In another aspect, the milling is in attrition mill which directly agitates the media to achieve grinding. In another aspect, the dry neat polymer powder is the same polymer as the attrition milled polymer. In another aspect, the dry neat polymer powder is a different polymer than attrition milled polymer. In another aspect, the dry neat polymer powder is non flowable (such as PTFE) and a dilution powder is PVDF.

In another embodiment, the present invention includes a method of coating a host particle for making a composite material with enhanced material properties, comprising: providing a powdered host; providing a powdered additive with a softening or melting temperature higher than the melting point of said powdered host; inputting said powdered host and said powdered additive to a mill; and coating said powdered host with said powdered additive in a mill for a milling time to sufficient mix but not melt the host particle, wherein the coating dramatically reduces the additive required to achieve a percolative network in the host. In one aspect, the host is a resin powder. In one aspect, the host is a metal powder. In one aspect, the host is a ceramic powder. In one aspect, the additive is a powder selected to alter at least one physical properties selected from thermal, electrical, optical, or mechanical. In one aspect, the additive is carbon black. In one aspect, the milling is in a ball mill, and wherein the ball mill uses stainless steel balls weighing at least 1 g each. In one aspect, the milling is in a closed chamber for 10 to 100 minutes at 1,000 RPM or less. In one aspect, the milling is a sand, bead, and horizontal mill at an rpm of 100-1000. In one aspect, the mill is an attrition mill directly agitates the media to achieve grinding. In one aspect, the method further comprises the step of dry blending a neat polymer powder to enhance flowability and processability of powder. In another aspect, the dry neat polymer powder is the same polymer as the attrition milled polymer. In another aspect, the dry neat polymer powder is a different polymer than attrition milled polymer. In another aspect, the dry neat polymer powder is non flowable (such as PTFE) and a dilution powder is PVDF.

In one embodiment, the present invention includes a method of making an additive coated host particle for making a composite material for enhancing the material property, comprising: providing a powdered host; providing a powdered additive with a softening or melting temperature higher than the melting point of said powdered host; inputting said powdered host and said powdered additive to a ball mill; milling said powdered host and said powdered additive for a milling time to sufficient mix but not melt the host particle; and dry blending a neat polymer powder to enhance flowability and processability of powder. In another aspect, the dry neat polymer powder is the same polymer as the attrition milled polymer. In another aspect, the dry neat polymer powder is a different polymer than attrition milled polymer. In another aspect, the dry neat polymer powder is non flowable (such as PTFE) and a dilution powder is PVDF.

DESCRIPTION OF THE PREFERRED EMBODIMENTS

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Non-limiting examples of a "host" or "host material", which terms are used interchangeably, for use with the present invention include, e.g., metals, ceramics, resins, ordinary Portland cement, polypropylene (PP), polyethylene (PE), Polycarbonate (PC), ceramic powders, ceramic powder is aluminum oxide, zirconium oxide, silica, silicon dioxide, or combination thereof, metal powders, metal powders of titanium, titanium hydride, tantalum, cobalt chrome, niobium, stainless steel, nickel, copper, aluminum, or combinations thereof, a polycrystalline material, polyvinylidene fluoride (PVF), or polyvinylidene difluoride (PVDF), polyurethane, poly(butyleneterephthalate), nylon 11, poly(ethyleneterephthalate), poly(ether ether ketone), poly(phenylene sulfide), polyolefin, an oxide, carbonate or silicate of an element of Groups 2a, 3a, 4a and 4b of the Periodic Table, poly(vinyl chloride) (PVC), poly(methylmethacrylate), polystyrene, polycarbonate/nylon alloy, polycarbonate/polyester alloy, ABS, ABS/nylon alloy, ABS/PVC alloy, acrylic copolymers, polysulfone, polysulfone/ABS alloy, polyetherimides, polyamide-imides, polyarylates, fluoropolymers, polyphenylene oxide/polystyrene blend, or poly(phenylene sulfide).

Carbon black and host particles can be subjected to mechanochemical processing in what is generically referred to as a "ball mill." When grinding in the ball mill, the balls (media) in their random movement are rolling against each other and the container, exerting shearing forces on the carbon black and the particles from the host. The resulting host particles can be coated on the exterior and have not been melted nor has the host particle's size been reduced by more than 20% due to the milling process.

Due to the cost differential between crystalline graphite and carbon black, the latter has been widely adopted as an additive. Other forms of carbon powder may be used with carbon black, or as an alternative to carbon black.

A useful and simple equation describing the grinding momentum is m×v (mass×velocity), which enables the user to see how the attrition mill fits into the family of mills. For example, a 2-liter ball mill uses 6 lbs (or ~2600 stainless steel balls) of 0.25" diameter stainless steel balls weighing 1 g each. Milling or mixing can be accomplished in a closed chamber for 10 to 100 minutes at 1,000 RPM or less to coat the host particles. The other mills, such as sand, bead, and horizontal, use smaller media from 0.3 mm to 2 mm, but run at a very high rpm (roughly 100-1000). High-speed dispersers with no media run at an even faster rpm (1000-4000). An attrition mill directly agitates the media to achieve grinding.

For efficient fine grinding, both impact action and shearing force are generally required. The grinding media's random movement and spinning at different rotational energies exert shearing forces and impact forces on the carbon black and host particles. The milling/mixing time may range from 5 to 60 minutes. The combination of milling/mixing speed, media size and milling/mixing time enables the production of a host particle covered with an additive. This additive encased host particle improves the efficacy of the use of an additive. This milling/mixing process and resulting additive covered host particle in the case of carbon black can reduced the resistivity of the composite material by as much as 2,000 times for the same loading, opening new applications or reducing the loading requirement for current applications. The GO/Polymer masterbatch is dry mixed in an in-bin tumble mill with a neat polymer powder to reduce the concentration by half or to an arbitrary dilution. The dry neat powder can be a polymer other than the original powder to enhance flowability and processability and when combined with GO/Polymer result is a highly electrically high strength conductive composite.

Depending on the mechanical properties of the polymer the milling process may damage the polymer. This damage translates to poor physical properties in the compression molded or extruded polymer parts, as well as reducing the flowability of the compounded GO/Polymer masterbatch powder. To address this issue one makes a higher loading of GO/polymer master batch as an example to achieve a 5% loading of GO in a polymer one produces a 10% loading of the GO in the polymer using the milling process as described above. The 10% GO/polymer powder is then dry mixing with the neat polymer powder to reduce the concentration by half. The dry powder can be blended in an in-bin tumble mill or other blending process that does not damage the additional neat polymer. Additionally the dry neat powder can be a polymer other than the original powder to enhance flowability and processability. As an example Polyvinylidene fluoride (PVF), or polyvinylidene difluoride (PVDF) is extrudable polymer while Polytetrafluoroethylene (PTFE) is a polymer that does not flow and is generally compression molded into a block and them machined into the final product. GO can be ball milled with PVDF and the dry mixed with PTFE to produce an extrudable composite polymer.

As long as the PTFE is at least 20% of the blend powder then the resulting composite will have the physical properties of bulk PTFE. When combined with GO the result is a highly electrically conductive composite.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making an additive-coated host particle for making a composite material, comprising:
   providing a powdered host;
   providing graphene oxide as a powdered additive with a softening or melting temperature higher than a melting point of the powdered host;
   inputting the powdered host and the graphene oxide to a ball mill;
   milling the powdered host and the graphene oxide for a milling time to sufficiently mix the powdered host and the graphene oxide but not melt the host particle to coat the powdered host with the graphene oxide; and
   lowering a viscosity of the powdered host coated with the graphene oxide by dry blending a neat polymer powder with the powdered host coated with the graphene oxide.

2. The method of claim 1, wherein the powdered host comprises a resin powder.

3. The method of claim 1, wherein the powdered host is a powder from a metal.

4. The method of claim 1, wherein the powdered host is a powder from a ceramic.

5. The method of claim 1, wherein the powdered additive is a powder to alter physical properties of the powdered host, including thermal, electrical, optical or mechanical properties.

6. The method of claim 1, wherein the milling is in a ball mill, and wherein the ball mill uses stainless steel balls weighing at least 1 g each.

7. The method of claim 1, wherein the milling is in a closed chamber for 10 to 100 minutes at 1,000 RPM or less.

8. The method of claim 1, wherein the milling is in a sand, bead, and horizontal mill at an rpm of 100-1000.

9. The method of claim 1, wherein the milling is in an attrition mill that directly agitates media to achieve grinding.

10. The method of claim 1, wherein the powdered host is a polymer, and wherein the neat polymer powder is the same polymer as the powdered host.

11. The method of claim 1, wherein the powdered host is a polymer, and wherein the neat polymer powder is a different polymer than the powdered host.

12. The method of claim 11, wherein the neat polymer powder is non-flowable polytetrafluoroethylene (PTFE) and the powdered host is polyvinylidene difluoride (PVDF).

13. A method of coating a host particle for making a composite material, comprising:
providing a powdered host;
providing graphene oxide as a powdered additive with a softening or melting temperature higher than a melting point of the powdered host;
inputting the powdered host and the graphene oxide into a mill to coat the powdered host with the graphene oxide;
coating the powdered host with the graphene oxide in the mill for a milling time to sufficiently mix but not melt the host particle, wherein the coating reduces the graphene oxide required to achieve a percolative network in the host; and
lowering a viscosity of the powdered host coated with the graphene oxide by dry blending a neat polymer powder with the powdered host coated with the graphene oxide.

14. The method of claim 13, wherein the powdered host comprises a resin powder.

15. The method of claim 13 wherein the powdered host is a metal powder.

16. The method of claim 13, wherein the powdered host is a ceramic powder.

17. The method of claim 13, wherein the powdered additive is selected to alter at least one physical property of the powdered host selected from thermal, electrical, optical, or mechanical properties.

18. The method of claim 13, wherein the mill is a ball mill, and wherein the ball mill uses stainless steel balls weighing at least 1 g each.

19. The method of claim 13, wherein the milling is in a closed chamber for 10 to 100 minutes at 1,000 RPM or less.

20. The method of claim 13, wherein the coating is in a sand, bead, and horizontal mill at an rpm of 100-1000.

21. The method of claim 13, wherein the mill is an attrition mill that directly agitates media to achieve grinding.

22. The method of claim 13, wherein the powdered host is a polymer, and wherein the neat polymer powder is the same polymer as the powdered host.

23. The method of claim 13, wherein the powdered host is a polymer, and wherein the neat polymer powder is a different polymer than the powdered host.

24. The method of claim 23, wherein the neat polymer powder is non-flowable polytetrafluoroethylene (PTFE) and the powdered host is polyvinylidene difluoride (PVDF).

* * * * *